United States Patent
Connolly et al.

(10) Patent No.: US 10,787,087 B2
(45) Date of Patent: Sep. 29, 2020

(54) VEHICLE CHARGER ELECTRICAL OUTLET DIAGNOSTIC

(71) Applicant: Ford Global Technologies, LLC, Dearborn, MI (US)

(72) Inventors: Brittany Connolly, Plymouth, MI (US); Sriram Jala, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 15/928,388

(22) Filed: Mar. 22, 2018

(65) Prior Publication Data
US 2019/0296565 A1   Sep. 26, 2019

(51) Int. Cl.
| | |
|---|---|
| H02J 7/00 | (2006.01) |
| H02H 1/00 | (2006.01) |
| H02H 5/04 | (2006.01) |
| B60L 53/14 | (2019.01) |
| B60L 58/24 | (2019.01) |
| B60L 53/62 | (2019.01) |

(52) U.S. Cl.
CPC ............... *B60L 53/14* (2019.02); *B60L 53/62* (2019.02); *B60L 58/24* (2019.02); *H02H 1/0007* (2013.01); *H02H 5/04* (2013.01); *H02J 7/0031* (2013.01); *H02J 7/0047* (2013.01); *H02J 7/00309* (2020.01); *B60L 2240/36* (2013.01)

(58) Field of Classification Search
None
See application file for complete search history.

(56) References Cited

U.S. PATENT DOCUMENTS

| | | |
|---|---|---|
| 9,211,801 B2 | 12/2015 | Akai et al. |
| 2013/0335024 A1* | 12/2013 | Akai .................. B60L 3/04 320/109 |
| 2014/0084859 A1 | 3/2014 | Hall et al. |
| 2016/0339786 A1 | 11/2016 | Dickinson et al. |

FOREIGN PATENT DOCUMENTS

WO   2016075267 A1   5/2016

* cited by examiner

*Primary Examiner* — David V Henze-Gongola
(74) *Attorney, Agent, or Firm* — David B. Kelley; Brooks Kushman P.C.

(57) ABSTRACT

A system for a vehicle includes an electrical port that charges a vehicle battery via a connection to a power source, and a controller configured to interrupt charging and to display an alert responsive to temperature at the connection being greater than a threshold and voltage of a control pilot terminal of the port being at an overtemperature state voltage that is different from each of disconnected, connected, ready, and fault state voltages.

12 Claims, 4 Drawing Sheets

VEHICLE CHARGER ELECTRICAL OUTLET DIAGNOSTIC

TECHNICAL FIELD

The present disclosure relates to systems and methods for detecting an overheating condition in an electrical outlet used to charge a vehicle.

BACKGROUND

A high voltage battery in an electrified vehicle may be recharged using either alternating current (AC) or direct current (DC) charging. The vehicle may be connected to an AC power grid and receive electric energy via AC Level 1 or AC Level 2 charging using a 120-volt (V) or 240-V connection, respectively. A connection to a DC charge-capable charging station may allow for recharging of the high voltage battery at various current rates, such as DC Level 1 200-450 V/80 amperes (A), DC Level 2 200-450V/200 A, DC Level 3 200-450V/400 A, and so on.

SUMMARY

A system for a vehicle includes an electrical port that charges a vehicle battery via a connection to a power source, and a controller configured to interrupt charging and to display an alert responsive to temperature at the connection being greater than a threshold and voltage of a control pilot terminal of the port being at an overtemperature state voltage that is different from each of disconnected, connected, ready, and fault state voltages.

A method for a vehicle includes interrupting, by a controller, charging of a traction battery connected to a power source and issuing an alert responsive to temperature at the connection being greater than a threshold and voltage of a control pilot terminal of the port being at an overtemperature state voltage that is different from each of connected, disconnected, fault, and ready state voltages.

A charging cord for a vehicle includes electrical terminals that cooperate with corresponding terminals of the vehicle and a power source to complete an electrical circuit therebetween, and a controller configured to, responsive to temperature of the power source terminals being greater than a threshold, interrupt charging and set voltage of one of the terminals to an overtemperature state voltage to issue an overtemperature notification.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A charging system for a hybrid or electric vehicle may include an (alternating current) AC charging cord having a cord plug. In some examples, the plug may be configured to cooperate with an AC outlet such that the vehicle battery may be charged using residential or commercial electric power grid. The plug may include a thermistor configured to detect that temperature between the outlet and the plug is greater than a predefined threshold.

Responsive to temperature between the outlet and the plug being greater than a threshold, a fault indicator light may be illuminated on the cord or the plug. However, a vehicle user may in some instances fail to notice that the indicator light is illuminated or may incorrectly attribute the present fault to either the cord or the vehicle and not with the outlet.

In some examples, a controller of a vehicle receiving charge from a given outlet may be configured to detect that outlet temperature exceeds a threshold and may cause a corresponding alert to be displayed to the user on an in-vehicle display and/or a connected or associated mobile device. The alert message specifically informing the user that a fault occurred in the outlet with which the vehicle is currently connected may prevent or reduce instances of misdiagnoses of the cord and the vehicle charging system. As one non-limiting example, the controller may be in communication with the cord using one or more in-vehicle networks.

In some other examples, the controller may be configured to set voltage of a control pilot signal terminal according to a predefined voltage to cause the vehicle to issue an in-vehicle user notification and/or a connected mobile device notification indicating that an overtemperature fault condition has been detected at the outlet connected with the vehicle. Voltage indicative of an overtemperature fault state may be different from voltages corresponding to other association, initialization, and active charge transfer states, including, but not limited to, a disconnected state voltage, a connected state voltage, a ready state voltage, and fault state voltage.

Figure 1:
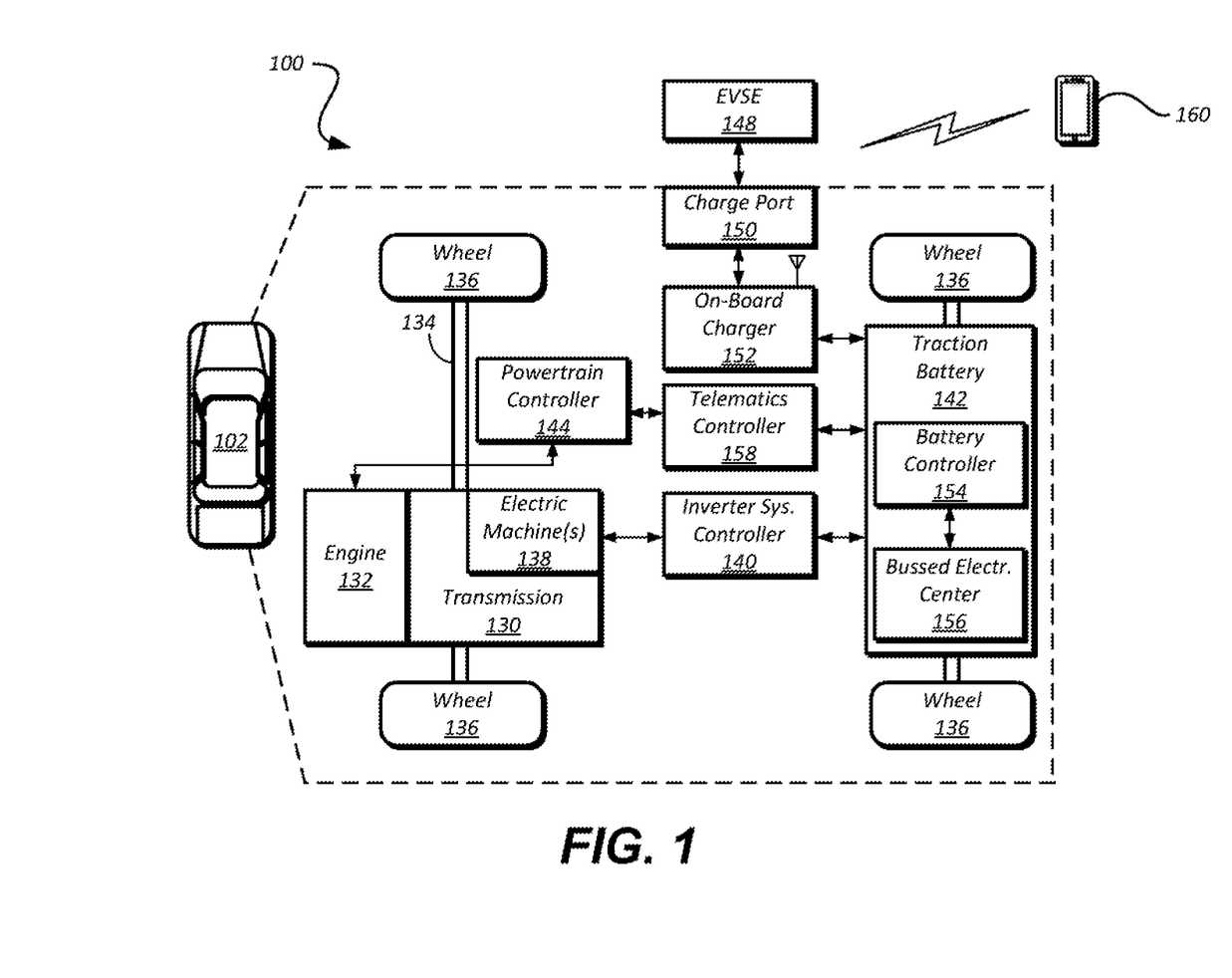
FIG. 1 is a block diagram of a plug-in hybrid electric vehicle (PHEV) illustrating a typical drivetrain and energy storage components.

FIG. 1 illustrates an example plug-in hybrid-electric vehicle (PHEV) power system 100-A of a vehicle 102. The vehicle 102 may comprise a hybrid transmission 130 mechanically connected to an engine 132 and a drive shaft 134 driving wheels 136. A powertrain controller 144 configured to provide control of the engine 132 operating components (e.g., idle control components, fuel delivery components, emissions control components, etc.) and monitoring of the engine 132 operating components (e.g., status of engine diagnostic codes). The hybrid transmission 130 may also be mechanically connected to one or more electric machines 138 capable of operating as a motor or a generator. The electric machines 138 may be electrically connected to an inverter system controller (hereinafter, inverter) 140 providing bi-directional energy transfer between the electric machines 138 and at least one traction battery 142.

The traction battery 142 typically provides a high voltage (HV) direct current (DC) output. In a motor mode, the inverter 140 may convert the DC output provided by the traction battery 142 to three-phase AC as may be required for proper functionality of the electric machines 138. In a regenerative mode, the inverter 140 may convert the three-phase AC output from the electric machines 138 acting as generators to the DC required by the traction battery 142. In addition to providing energy for propulsion, the traction battery 142 may provide energy for high voltage loads (not illustrated), such as compressors and electric heaters, and low voltage loads (not illustrated), such as electrical accessories, an auxiliary 12-V battery, and so on.

The vehicle 102 may be configured to recharge the traction battery 142 via a connection to a power grid. The vehicle 102 may, for example, cooperate with electric vehicle supply equipment (EVSE) 148 of a charging station to coordinate the charge transfer from the power grid to the traction battery 142. In one example, the EVSE 148 may have a charge connector for plugging into a charge port 150 of the vehicle 102, such as via connector pins that mate with corresponding recesses of the charge port 150. The charge port 150 may be electrically connected to an on-board power conversion controller (hereinafter, charger) 152. The charger 152 may condition the power supplied from the EVSE 148 to provide the proper voltage and current levels to the traction battery 142. The charger 152 may interface with the EVSE 148 to coordinate the delivery of power to the vehicle 102.

The EVSE 148 may be designed to provide single- or three-phase AC or DC power to the vehicle 102. Differences in the charge connector and charging protocol may exist between an AC-, a DC-, and an AC/DC-capable EVSE. The EVSE 148 may further be capable of providing different levels of AC and DC voltage including, but not limited to, Level 1 120-volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on.

In one example, both the charge port 150 and the EVSE 148 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charge port 150 may comprise a plurality of terminals, including one or more terminals configured to transfer power during Level 1 and 2 AC power exchange, a terminal configured to provide a ground connection, one or more terminals configured to transfer single- or multi-way control signals, and one or more terminals configured to transfer power during DC charging, such as, but not limited to, during Levels 1, 2, or 3 DC charging.

By way of an example, a charging cord connected with the charge port 150 may include a control signal terminal configured to transfer control pilot signals and a proximity signal terminal configured to transfer proximity detection signals. In some examples, a proximity signal may be a signal indicative of a state of engagement between the charge port 150 and the connector of the EVSE 148. In some other examples, a control pilot signal received by the charger 152 may include a low-voltage pulse-width modulation (PWM) signal configured to control charging of the vehicle 102.

The charger 152 may be in communication with a battery controller 154 of the traction battery 142. The battery controller 154 may be configured to manipulate a plurality of connectors and switches of a bussed electrical center (BEC) 156 to enable the supply and withdrawal of electric energy to and from the traction battery 142. In one example, the battery controller 154 may manipulate the connectors and switches of the BEC 156 based on one or more measured and/or estimated properties of the traction battery 142.

Each of the charger 152 and the battery controller 154 may be electrically connected to and in communication with one or more other vehicle controllers, such as the inverter 140, the powertrain controller 144, and so on. The charger 152, the battery controller 154, and other vehicle controllers may be further configured to communicate with one another and with other components of the vehicle 102 via one or more in-vehicle networks, such as, but not limited to, one or more of a vehicle controller area network (CAN), an Ethernet network, and a media oriented system transfer (MOST), as some examples. For example, the charger 152, the battery controller 154, and other vehicle controllers may communicate with a first set of vehicle systems, subsystems, or components over a first in-vehicle network, and with a second set of vehicle systems, subsystems, or components over a second in-vehicle network. In other examples, the computing platform may be connected to more or fewer in-vehicle networks. Additionally or alternately, one or more vehicle 102 systems, subsystem, or components may be connected to the vehicle controllers via different in-vehicle networks than described, or directly, e.g., without connection to an in-vehicle network.

As some non-limiting possibilities, the vehicle controllers may include a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

In some instances, the charger 152 and the powertrain controller 144 may be electrically connected to and in communication with a telematics controller 158 connected with an in-vehicle display (not illustrated). The display may also receive input from human-machine interface (HMI) controls, e.g., one or more buttons, configured to provide for occupant interaction with the vehicle 102 to invoke vehicle 102 functions (e.g., steering wheel audio buttons, a push-to-talk button, instrument panel controls, etc.). Thus, the display may be configured to display, for example, current vehicle 102 diagnostics status, as well as, various other types of information provided by various controllers of the vehicle 102. The vehicle 102 may also provide one or more audio outputs to an input of the audio playback functionality of an audio module and/or provide audio output to the occupants through use of one or more dedicated speakers (not illustrated).

One or more controllers of the vehicle 102 may be configured to communicate with one or more mobile devices 160 positioned inside, outside, or within a predefined distance of the vehicle 102. Examples of the mobile devices may include, but are not limited to, cellular phones, tablet computers, smart watches, laptop computers, portable music players, or other portable computing devices capable of communication with the controllers of the vehicle 102. In some examples, the charger 152 and/or the telematics controller 158 may include a wireless transceiver (e.g., one or more of a BLUETOOTH controller, a ZigBee® transceiver, a Wi-Fi transceiver, etc.) configured to communicate with a compatible wireless transceiver of the mobile device 160. In some cases, the mobile devices 160 seeking permission to connect to the controller of the vehicle 102 may be identified by the telematics controller 158 according to previously stored paired device data that is maintained in the storage medium of the controller 158.

Additionally or alternatively, one or more controllers of the vehicle 102 may communicate with the mobile devices 160 via a wide-area network (not illustrated) providing communications services, such as packet-switched network services (e.g., Internet access, VoIP communication services), to devices 160 connected to the wide-area network. An example of a wide-area network may include a cellular telephone network. The telematics controller 158 may, for instance, utilize the in-vehicle modem of the vehicle 102 to connect to the wide-area network. Similar to the telematics controller 158, the mobile devices 160 may connect to a same or different wide-area network using a corresponding mobile device 160 modem, such as via associated unique device identifiers (e.g., media access control (MAC) addresses, mobile device numbers (MDNs), Internet protocol (IP) addresses, mobile station international subscriber directory numbers (MSISDNs), international mobile subscriber identity (IMSI), etc.) identifying the communications of the mobile devices 160 over that wide-area network. In some examples, the mobile applications installed and maintained on the mobile device 160 may be configured to communicate with the controllers of the vehicle 102 or other locally-networked devices and with the wide-area network.

While FIG. 1 illustrates the inverter 140, the powertrain controller 144, the charger 152, the battery controller 154. the telematics controller 158 as being separate components, the vehicle 102 may include more or fewer controllers arranged in similar or different ways. Each of the controllers of the vehicle 102 may include one or more processors connected with both a memory and a computer-readable storage medium and configured to perform instructions, commands, and other routines in support of the processes described herein. For instance, the processor of the controller may be configured to execute instructions of vehicle applications to provide features such as diagnostic notifications, navigation, satellite radio decoding, and hands-free calling. Such instructions and other data may be maintained within the corresponding controller, or combination of controllers, in a non-volatile manner using a variety of types of computer-readable storage medium. The computer-readable medium (also referred to as a processor-readable medium or storage) includes any non-transitory (e.g., tangible) medium that participates in providing instructions or other data that may be read by the processor of the computing platform. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Figure 2A:
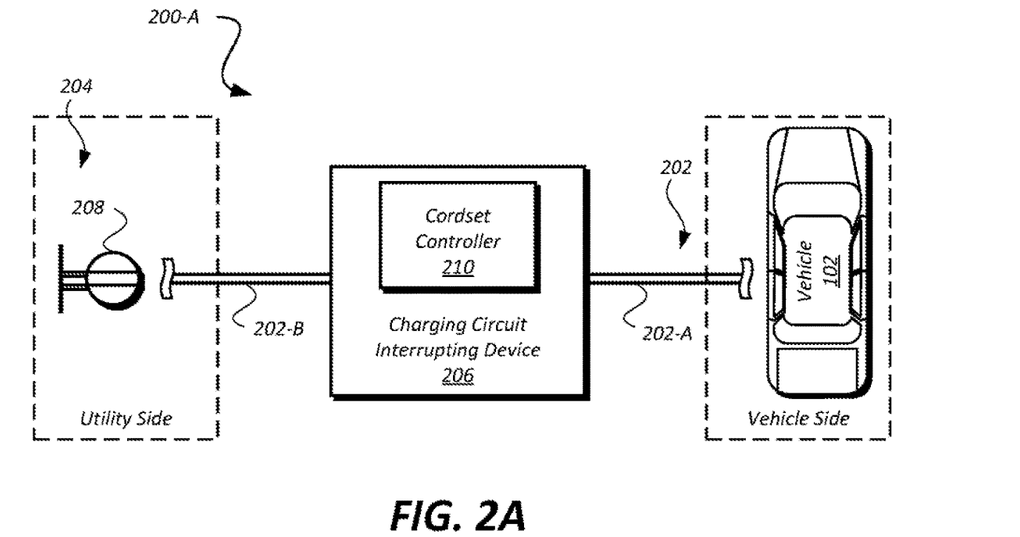
FIG. 2A-2B are block diagrams illustrating example vehicle charging systems.

FIG. 2A illustrates an example charging system 200-A for charging battery of the vehicle 102 using the utility system 204. The utility system 204 may include access to an electric power source, such as, but not limited to, residential or commercial power grid access, energy storage bank, and so on. A charging cord 202 may be an electrical cord configured to transfer electric energy from the utility system 204 to the vehicle 102. As some non-limiting examples, the charging cord 202 may be configured to transfer an AC and/or DC energy and may be electrically rated to transfer predefined values of voltage, current, energy, power, and so on.

The charging cord 202 may include a vehicle side having a vehicle side connector 202-A and a utility side having a utility side connector 202-B. In some instances, the utility side connector 202-B may include a plurality of utility side electrical terminals configured to cooperate with corresponding terminals of an outlet 208 of the utility system 204. As some non-limiting examples, the charging cord 202 may be configured to comply with industry standards pertaining to electrified vehicle charging, such as Society of Automotive Engineers (SAE) J1772, J1773, J2954, International Organization for Standardization (ISO) 15118-1, 15118-2, 15118-3, the German DIN Specification 70121, and so on.

The vehicle side connector 202-A may include a plurality of vehicle side electrical terminals configured to cooperate with corresponding terminals of the charge port 150. In some examples, connecting the vehicle side connector 202-A to the charge port 150 of the vehicle 102 and connecting the utility side connector 202-B to the outlet 208 of the utility system 204 completes an electrical circuit therebetween to charge the traction battery 142 of the vehicle 102.

A charging circuit interrupting device (hereinafter, interrupting device) 206 may be configured to monitor and control energy flow between the outlet 208 and the vehicle 102. In one example, the interrupting device 206 is connected to and in communication with, e.g., via the vehicle side connector 202-A and the charge port 150, the charger 152 of the vehicle 102. The interrupting device 206 may be configured to selectively open the electrical circuit to interrupt charging the traction battery 142 of the vehicle 102 responsive to one or more conditions and/or responsive to one or more signals received from the charger 152. In another example, the interrupting device 206 may be configured to close the charging circuit between the utility system and the vehicle 102 to continue charging the traction battery 142 responsive to a previously detected fault no longer being present or responsive to another signal or command.

The interrupting device 206 may be configured to receive signals from one or more sensors disposed within the charging cord 202. In one example, the utility side connector 202-B may include a thermistor or another device (not shown) electrically connected to the interrupting device 206 and configured to detect that temperature between the outlet 208 and the connector 202-B is greater than a threshold. The thermistor may include one or more analog or digital electronic devices, such as, but not limited to, resistors, capacitors, inductors, and so on, whose change in output resistance corresponds to a change in surrounding temperature.

In response to temperature of the outlet 208 being greater than a threshold, the interrupting device 206 may send a signal to the charger 152 of the vehicle 102 indicating that an overtemperature condition has been detected. The interrupting device 206 may include a cordset controller (hereinafter, controller) 210 configured to set voltage of one or more terminals of the vehicle side and utility side connectors 202-A, 202-B.

Figure 2B:
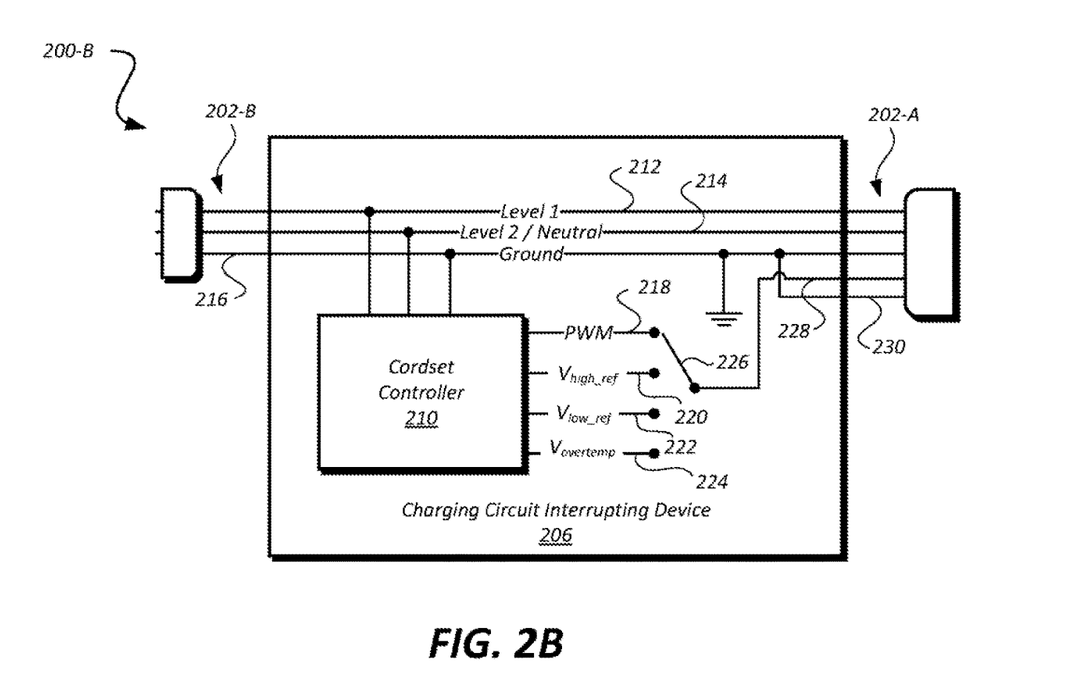

FIG. 2B illustrates an example charge cord 200-B for transferring power and communication signals between the EVSE 148 and the vehicle 102. In one example, responsive to one or more voltage values of the terminals set by the controller 210, the charger 152 may be configured to selectively issue a command to charge the vehicle 102, to interrupt and/or prevent charging of the vehicle 102 battery, and so on. The utility connector 202-B of the charge cord 200-B may include a Level 1 AC charging signal terminal 212, a Level 2 AC or Neutral charging signal terminal 214, and a ground signal terminal 216. The terminals 212, 214, and 216 may further extend through the charging circuit interrupting device 206 to the vehicle connector 202-A. Additionally or alternatively, the vehicle connector 202-A may include a control pilot signal terminal 228 and a proximity detection signal terminal 230.

The controller 210 includes a plurality of output contacts, such as, but not limited to, a pulse-width modulation (PWM) contact 218, high and low voltage contacts 220 and 222, respectively, and an overtemperature contact 224. The contacts 218, 220, 222, and 224 may each be selectively electrically connected to a relay 226 to output a corresponding signal to the control pilot signal terminal 228. In some instances, the controller 210 may operate the contacts 218, 220, 222, and 224 to electrically connect with the relay 226 responsive to a corresponding signal from one of the EVSE 148 and the charger 152 of the vehicle 102.

Figure 3:
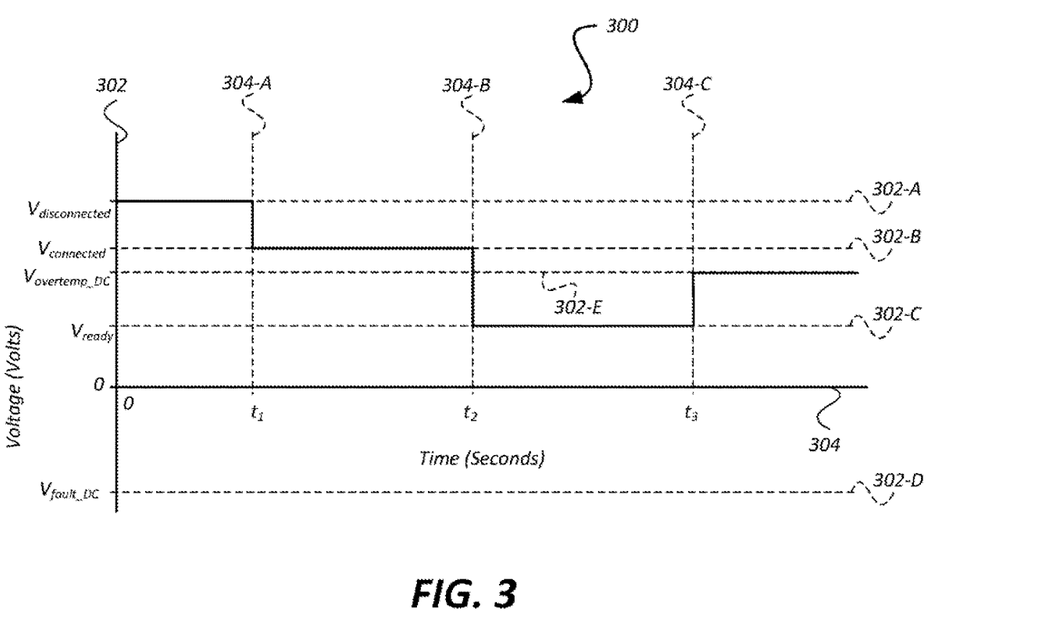
FIG. 3 is a graph illustrating voltage of a control pilot signal terminal.

FIG. 3 illustrates an example graph 300 for operating the contacts 218, 220, 222, and 224 and the relay 226 to output a corresponding voltage to the control pilot signal terminal 228. The graph 300 illustrates a change in voltage 302 of the control pilot signal terminal 228 with respect to time 304. The controller 210 may set voltage of the control pilot signal terminal 228 to a disconnected state voltage $V_{disconnected}$ 302-A to indicate that the vehicle 102 is not connected with the utility outlet 208 or that the controller 210 is experiencing a fault. In some instances, the disconnected state voltage $V_{disconnected}$ 302-A may correspond to one of maximum or minimum operating voltages $V_{high\_ref}$ and $V_{low\_ref}$, respectively, of the controller 210. The charger 152 of the vehicle 102 may inhibit power transfer to the battery 142 via the charge cord 200 responsive to voltage of the control pilot signal terminal 228 being the disconnected state voltage $V_{disconnected}$ 302-A.

As another example, the controller 210, at a time $t_1$ 304-A, may set voltage of the control pilot signal terminal 228 to a connected state voltage $V_{connected}$ 302-B to indicate both that the vehicle 102 is connected to the utility outlet 208 and at least one of (i) the vehicle 102 is not ready to receive energy and (ii) the utility outlet 208 is not ready to supply energy. Additionally or alternatively, the setting of voltage of the pilot signal terminal 228 to the connected state voltage $V_{connected}$ 302-B may include activating the PWM contact 218 of the controller 210 at a first threshold duty cycle $D_{connected}$. Thus, the connected state voltage $V_{connected}$ 302-B is different from the disconnected state voltage $V_{disconnected}$ 302-A and the charger 152 may initiate an association with the EVSE 148 responsive to voltage of the control pilot signal terminal 228 being the connected state voltage $V_{connected}$ 302-B.

As still another example, at a time $t_2$ 304-B, the controller 210 may set voltage of the control pilot signal terminal 228 to a ready state voltage $V_{ready}$ 302-C to indicate that the vehicle 102 is connected to the utility outlet 208, the vehicle 102 is ready to receive energy and the utility outlet 208 is ready to supply energy. As with the connected state voltage $V_{connected}$ 302-B, the setting of voltage of the pilot signal terminal 228 to the ready state voltage $V_{ready}$ 302-C may include activating the PWM contact 218 of the controller 210 at a second threshold duty cycle $D_{ready}$. The second threshold duty cycle $D_{ready}$ of the ready state voltage $V_{ready}$ 302-C may be different from the first threshold duty cycle $D_{connected}$ corresponding to the connected state voltage $V_{connected}$ 302-B. Thus, the ready state voltage $V_{ready}$ 302-C is different from the connected and disconnected state voltages $V_{connected}$ 302-B and $V_{disconnected}$ 302-A, respectively, and the charger 152 may initiate charging of the traction battery 142 responsive to voltage of the control pilot signal terminal 228 being the ready state voltage $V_{ready}$ 302-C.

The controller 210 may set voltage of the control pilot signal terminal 228 to a fault state voltage $V_{fault\_DC}$ 302-D to indicate that an issue has been detected with the utility outlet 208. In one example, the fault state voltage $V_{fault\_DC}$ 302-E may be a static, i.e., direct current (DC), voltage, such that the duty cycle D output by the PWM contact 218 is zero (0). In some instances, the fault state voltage $V_{fault}$ 302-D may correspond to a minimum operating voltage $V_{low\_ref}$ of the controller 210. The charger 152 of the vehicle 102 may terminate and/or inhibit power transfer to the battery 142 via the charge cord 200 responsive to voltage of the control pilot signal terminal 228 being the fault state voltage $V_{fault}$ 302-D.

The controller 210, at a time $t_3$ 304-C, may be configured to set voltage of the control pilot signal terminal 228 according to an overtemperature state voltage $V_{overtemp}$ 302-E to indicate that an overtemperature condition has been detected at the utility outlet 208. In one example, the overtemperature state voltage $V_{overtemp\_DC}$ 302-E may be a static, i.e., direct current (DC), voltage and may be different from static voltage of the fault state voltage $V_{fault\_DC}$ 302-D. Thus, the setting of voltage of the pilot signal terminal 228 to the overtemperature state voltage $V_{overtemp\_DC}$ 302-E may include deactivating the PWM contact 218 of the controller 210 such that the corresponding duty cycle D being output by the contact 218 is zero (0). Said another way, the connected state voltage $V_{overtemp\_DC}$ 302-E is different from the fault state voltage $V_{fault\_DC}$ 302-D and the charger 152 may terminate charging of the battery 142 via the charging cord and display an overtemperature fault notification responsive to the PWM contact 218 being turned off and voltage of the control pilot signal terminal 228 being the overtemperature state voltage $V_{overtemp\_DC}$ 302-E.

Figure 4:
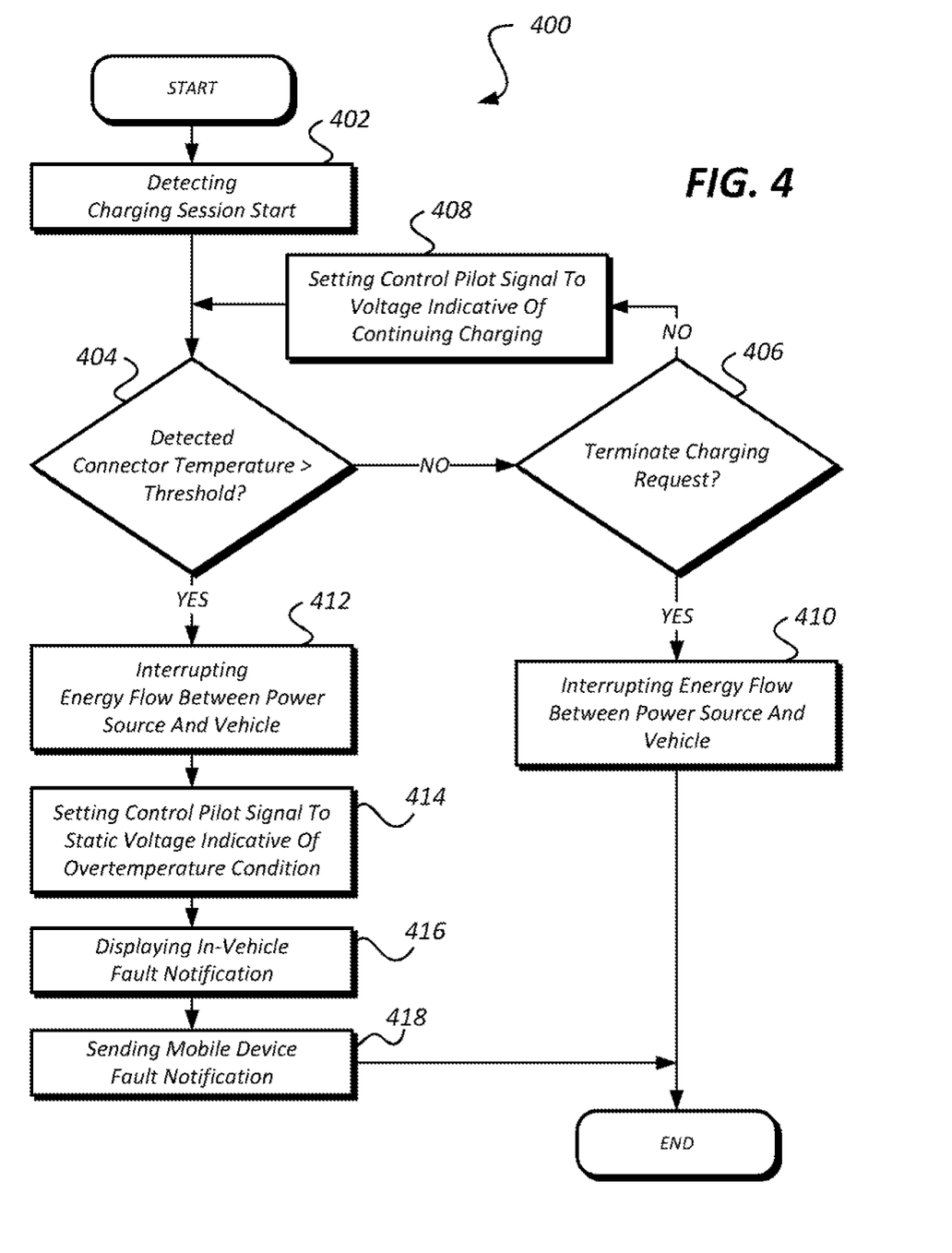
FIG. 4 is a flowchart illustrating an algorithm for detecting a power source overtemperature fault.

FIG. 4 illustrates an example process 400 for detecting an overtemperature condition during charging of the vehicle 102. The process 400 may begin at operation 402 where the controller 210 may detect that the vehicle 102 has been connected to the utility outlet 208 and may activate energy transfer from the power source 204 to the battery 142 of the vehicle 102. In one example, prior to activating the energy transfer, the controller 210 activates the PWM contact 218 to output a threshold duty cycle $D_{connected}$ greater than zero (0) and sets voltage of the control pilot signal terminal 228 to the connected state voltage $V_{connected}$, as described for example in reference to FIG. 3. In another example, the activation of the energy transfer may be preceded by a change of duty cycle output by the PWM contact 218 to a threshold duty cycle $D_{ready}$ and setting of voltage of the control pilot signal terminal 228 to the ready state voltage $V_{ready}$.

At operation 404, the controller 210 may determine whether temperature of the utility outlet 208 is greater than a threshold. For example, the controller 210 may be connected to and in communication with the thermistor or another sensing device that detects temperature changes of the utility outlet 208 during charging of the battery 142. In response to temperature of the utility outlet 208 being less than a threshold, the controller 210, at operation 406, may determine whether a request to terminate charging of the vehicle 102 has been received.

The controller 210 may continue charging the vehicle 102, at operation 408, responsive to detecting that the request to terminate charging has not been received. Additionally or alternatively, the controller 210 may interrupt charging of the vehicle 102, at operation 410, responsive to a request to terminate charging. While the process 400 includes continuing or interrupting energy transfer to the vehicle 102 after determining whether a request to terminate charging has been received, the process 400 may include more or fewer operations as a pre-condition for continuing or terminating charging of the vehicle 102.

At operation 412, the controller 210 interrupts energy transfer and inhibits charging of the vehicle 102 responsive to temperature of the utility outlet 208 being greater than a threshold. The controller 210, at operation 414, sets voltage of the control pilot signal terminal 228 to a overtemperature state voltage $V_{overtemp\_DC}$ to indicate that an overtemperature condition has been detected. The overtemperature state voltage $V_{overtemp\_DC}$ may be a static voltage, i.e., the PWM contact 218 may be turned off (deactivated) and/or have a duty cycle D approximately equal to zero (0). In some other examples, the overtemperature state voltage $V_{overtemp\_DC}$ may be different from corresponding voltages of the disconnected, connected, ready, and fault states.

The controller 210 may command displaying an in-vehicle user notification, at operation 416, indicating that temperature of the utility outlet 208 of the utility system 204 is greater than a threshold temperature. At operation 418, the controller 210 may command displaying a utility outlet overtemperature fault user notification on the mobile device 160. In one example, in response to voltage of the control pilot signal terminal 228 being an overtemperature state voltage $V_{overtemp\_DC}$, the charger 152 may be configured to send a request to the telematics controller 158 to issue a user notification to the mobile device 160 associated and/or paired with the vehicle 102. At this point, the process 400 may end. In some examples, the process 400 may be repeated responsive to detecting that the vehicle 102 is being charged via the utility outlet 208 or responsive to another signal or command.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
an electrical port that charges a vehicle battery via a connection to a power source: and
a controller configured to interrupt charging and display an alert responsive to temperature at the connection being greater than a threshold and voltage of a control pilot terminal of the port being at an overtemperature state voltage that is different from each of disconnected, connected, ready, and fault state voltages, wherein the overtemperature state voltage is both less than the disconnected and connected state voltages and greater than the ready and fault state voltages.

2. The system of claim 1, wherein the disconnected state voltage is +12 volts (V), the connected state voltage is +9V pulse-width modulation (PWM), the overtemperature state voltage is +7V direct current (DC), the ready state voltage is +6V PWM. and the fault state voltage is =12V.

3. The system of claim 1, wherein the ready and connected state voltages are averages resulting from modulating an analog signal at corresponding threshold duty cycles and the overtemperature, disconnected, and fault state voltages are static voltages generated without the modulating.

4. A method for a vehicle comprising:
interrupting, by a controller, charging of a traction battery via a connection to a power source to issue an alert responsive to temperature at the connection being greater than a threshold and voltage of a control pilot terminal being an overtemperature state voltage that is different from each of connected, disconnected, fault, and ready state voltages, wherein the ready state voltage is less than the connected state voltage and the overtemperature state voltage is less than the ready state voltage.

5. The method of claim 4, wherein the connected state voltage is +9V pulse-width modulation (PWM), the ready state voltage is +6V PWM, and the overtemperature state voltage is +5V direct current (DC).

6. The method of claim 4, wherein the ready and connected state voltages are averages resulting from modulating an analog signal at corresponding threshold duty cycles and the overtemperature, disconnected, and fault state voltages are static voltages generated without the modulating.

7. A charging cord for a vehicle comprising:
electrical terminals that cooperate with corresponding terminals of the vehicle and a power source to complete an electrical circuit therebetween; and
a controller configured to, responsive to temperature of the power source terminals being greater than a threshold, interrupt charging and set voltage of one of the terminals to an overtemperature state voltage to cause the vehicle to issue an overtemperature notification, wherein the overtemperature state voltage is both less than disconnected and connected state voltages and greater than ready and fault state voltages.

8. The cord of claim 7, wherein the disconnected state voltage is +12 volts (V), the connected state voltage is +9V pulse-width modulation (PWM), the overtemperature state voltage is +7V direct current (DC), the ready state voltage is +6V PWM, and the fault state voltage is −12V.

9. The cord of claim 7, wherein the ready state voltage is less than the connected state voltage and the overtemperature state voltage is less than the ready state voltage.

10. The cord of claim 9, wherein the connected state voltage is +9V pulse-width modulation (PWM), the ready state voltage is +6V PWM, and the overtemperature state voltage is +5V direct current (DC).

11. The cord of claim 7, wherein the ready and connected state voltages are averages resulting from modulating an analog signal at corresponding threshold duty cycles and the overtemperature, disconnected, and fault state voltages are static voltages generated without the modulating.

12. The cord of claim 7, wherein the notification is both transmitted to and displayed on a mobile device associated with the vehicle.

\* \* \* \* \*